Jan. 15, 1929.

C. E. OGDEN 1,698,921

METHOD OF CONSTRUCTING METALLIC RECTIFIER PLATES

Filed Feb. 17, 1928

Inventor.
Clarence E. Ogden,
By Arthur H.[illegible]
Attorney.

Patented Jan. 15, 1929.

1,698,921

UNITED STATES PATENT OFFICE.

CLARENCE E. OGDEN, OF CINCINNATI, OHIO, ASSIGNOR TO THE KODEL RADIO CORPORATION, A CORPORATION OF OHIO.

METHOD OF CONSTRUCTING METALLIC RECTIFIER PLATES.

Application filed February 17, 1928. Serial No. 255,137.

The present invention relates to the method of providing terminals on electrical rectifier plates of the oxide type.

In rectifier plates of the type above mentioned, the plate proper comprises one of the conductor terminals for the rectifying oxide film or films. In the practical construction of rectifying plates of this type, however, the entire plate must be heat treated, and thus the entire plate is, after processing, entirely covered with the films of oxide, and it is necessary that such films be removed from a portion of the plate in order to provide a suitable terminal for the necessary electrical connections. This may be accomplished by filing, sand-blasting or other similar method, but such processes require considerable time in the handling, thus adding materially to the cost of production. The oxide films, however, are relatively brittle, and I find that under proper treatment scale off of the metal quite easily, and the present method has for its principal object a construction and process by means of which such scaling may be effected from a part of the rectifying plate or unit to provide a suitable terminal. This I accomplish preferably by forming the plate with a terminal extension, upon which the oxide may be fractured, and from which it may be scaled without rupturing the rectifying films on the plate proper.

Figure 1:
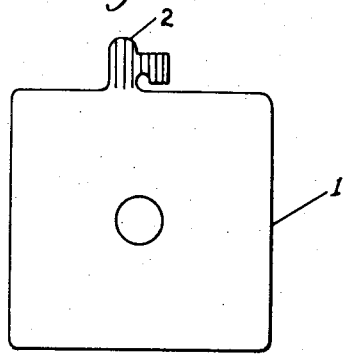
Figure 1 is a plan view of a rectifier plate or unit constructed in accordance with this invention.
Figure 2:
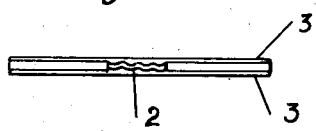
Figure 2 is an edge view of said plate.
Figure 3:
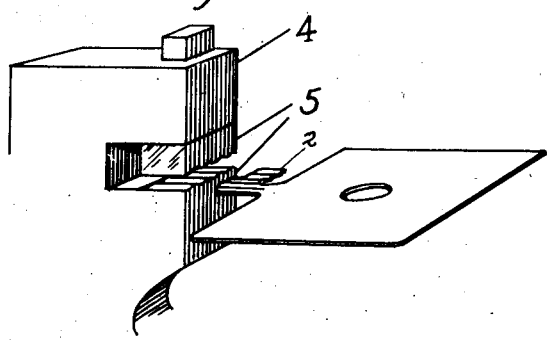
Figure 3 is a perspective view of the plate and means for carrying out the method comprising this invention.

The numeral 1 indicates a copper rectifying plate or unit, the same being provided with an extension or terminal 2. The plates 1, with terminals 2 may, it will be understood, be stamped from sheet copper. The plates or units 1, are heat treated and cooled to form thereon oxide films 3—3, such films covering the entire superficial areas of the plate and terminal. In order to prepare the extension or terminal 2, so that it may receive the usual electrical connector, it is necessary to remove the oxide therefrom, and this I accomplish by means of a press 4 and dies 5, which are arranged to receive and corrugate the terminal, as shown in the several figures of the drawing. This corrugation of the terminal serves to fracture the oxide films, and causes it to scale from the copper, thus leaving the copper clean and in condition to receive the connector.

It will be understood that various modifications may be made in the present invention, within the scope of the appended claims.

Having thus fully described my invention, what I claim as new and desire to secure by Letters Patent is:

1. The method of constructing metallic rectifier plates comprising forming a metallic plate with a terminal extension, forming an oxide film on said plate, and then fracturing the oxide on said extension to cause it to scale therefrom.

2. The method of constructing metallic rectifier plates comprising forming a metallic plate with a terminal extension, forming an oxide film on said plate, and then fracturing the oxide on said extension by means of a die to cause it to scale therefrom.

3. The method of constructing metallic rectifier plates comprising forming a metallic plate with a terminal extension, forming an oxide film on said plate, and then corrugating said extension by means of a die to fracture said oxide and cause it to scale therefrom.

CLARENCE E. OGDEN.